United States Patent Office 3,350,451
Patented Oct. 31, 1967

3,350,451
PRODUCTION OF N-(2,7-ALKADIENYL)AMINES
Edgar J. Smutny, San Francisco, Calif., assignor to Shell Oil Company, New York, N.Y., a corporation of Delaware
No Drawing. Filed May 14, 1965, Ser. No. 455,995
19 Claims. (Cl. 260—577)

This invention relates to a process for the production of N-(2,7-alkadienyl)amines. More particularly, it relates to N-(diene dimer)amines.

Methods are available in the art for the dimerization of conjugated dienes under conditions whereby a derivative of the diene dimer is observed. In general, such methods produce a diene dimer moiety which is branched, for example, from the dimerization of butadiene is typically obtained a methyl-heptadiene dimer moiety as the principal acyclic product type. General methods of producing diene dimer derivatives wherein the diene moieties have dimerized in a linear manner have not been available.

It is an object of the present invention to provide a method for the production of N-(2,7-alkadienyl)amines, and the novel products produced thereby. A more particular object is to provide an improved process for the production of N-amino derivatives of conjugated diene dimers wherein the diene dimer moiety is produced by diene dimerization in a linear manner. Further objects of the invention are to provide a novel class of N-(2,7-octadienyl) amines and an improved method for the production thereof.

It has now been found that these objects are accomplished by the process of reacting organic amines, wherein there is present at least one N-hydrogen substituent, with conjugated alkadienes, in the presence of certain metal compounds as catalyst and a phenoxide anion catalyst promoter. Although the mechanism of the condensation process is not completely understood, the process results in the efficient production of amines wherein the organic amine product has as a nitrogen substituent a moiety which may be considered as derived from a dimer of the diene reactant. By way of illustration, from the reaction of aniline and butadiene is obtained N-(2,7-octadienyl)aniline.

The conjugated diene employed as reactant in the process of the invention is an α,ω-conjugated alkadiene having only hydrogen substituents on the terminal carbon atoms of the four-carbon chain. Dienes that possess non-hydrogen substituents on the internal, i.e., non-terminal, carbon atoms are suitably employed, provided that the internal-carbon substituents do not unduly sterically hinder the diene dimerization. A preferred class of diene reactants comprises butadiene having from 0 to 2 internal-carbon methyl substituents. These compounds are butadiene, isoprene and 2,3-dimethylbutadiene. Of these, butadiene is particularly preferred.

In the process of the invention, the conjugated diene is contacted with an organic amine having within the molecular structure thereof at least one amino moiety, i.e., a trivalent nitrogen atom wherein from 1 to 2 of the nitrogen substituent(s) is (are) hydrogen and the remaining nitrogen valences are bonded to substituent group(s) through a bond to a carbon atom. The process of the invention is broadly applicable to a wide variety of organic amines of complex or comparatively simple structure which have at least one N-mono- to N,N-di-hydro-nitrogen moiety within the molecular structure. Best results, however, are obtained when the organic amine reactant employed in the process is of comparatively simple structure. The organic amine reactant suitably is an organic amine of up to 20 carbon atoms and is a monoamino compound or is a polyamino compound of up to 4 amino-nitrogen atoms, preferably up to 2. Whether the structure of the organic amine reactant of the present invention incorporates a plurality of amino moieties or only one amino moiety, at least one amino nitrogen has one N-hydrogen substituent, that is, the amino moiety is a secondary amino moiety, or has two N-hydrogen substituents, that is, the amine moiety is a primary amino moiety. The presence of other amino-nitrogen groups which are tertiary amine groups and therefore contain no N-hydrogen substituents is not detrimental to the process of the invention, but at least one amino moiety present in the organic amine reactant, preferably each amino moiety present, is non-tertiary, i.e., is either primary or secondary amino having from 1 to 2 N-hydrogen substituents. The organic portion of the amine reactant is suitably wholly aliphatic in character or incorporates one or more aromatic moieties. Furthermore, the amine reactant is suitably a hydrocarbon amine having only atoms of carbon and hydrogen besides the amino nitrogen atom(s), or is a substituted-hydrocarbon amine containing atoms of oxygen and halogen, particularly up to 4 atoms of halogen of atomic number from 18 to 35 inclusive, i.e., the middle halogens chlorine and bromine, which atoms are incorporated within functional groups such as ether, keto, ester, and halo groups, provided that the amine reactant as a whole is devoid of acidic hydrogens, that is, the amine reactant contains no hydroxylic hydrogen atoms. The amine reactant is further characterized by the absence therefrom of non-aromatic carbon-carbon unsaturation, so that the only carbon-carbon unsaturation present is aromatic, if any carbon-carbon unsaturation is present.

Illustrative amine reactants include aliphatic hydrocarbon monoamines such as methylamine, ethylamine, n-butylamine, iso-butylamine, 3-aminomethylheptane, n-dodecylamine, dimethylamine, dipropylamine, piperidine, methylhexylamine, cyclohexylamine, N-ethylcyclohexylamine and N-octyldodecylamine; hydrocarbon polyamines as exemplified by ethylenediamine, trimethylenediamine, 1,4-diaminohexane, diethylenetriamine, 1-aminodecalin, pyrrolidine, N,N-bis(2-aminoethyl)methylamine, 1,8-bis (4-aminobutylamino)octane and 1,4-bis(aminomethyl)cyclohexane; and substituted hydrocarbon mono- and polyamines, e.g., 3-chloropropylamine, 2-methoxyethylamine, 2-propoxy-1,3-diaminopropane, N-methyl-4-acetoxybutylamine, bis(2-methylaminoethyl)ether, 1-amino-4,5-dibromohexane and the like.

The class of suitable amines which incorporate aromatic moieties within the reactant molecular structure includes hydrocarbon wholly aromatic amines, e.g., aniline, benzidine, p-phenylenediamine, pyrrole and α-naphthylamine; alkarylamines and aralkylamines such as benzylamine, o-toluidine, p-toluidine, β-phenylethylamine, N-methylaniline, 1,2,3,4-tetrahydroquinoline, 2-aminotetralin, N-propylbenzylamine, N-butylaniline, N,N'-bis(ethylamino)benzene, 2,2-bis(4-aminophenyl)propane, 2,6-dimethylaniline, N,N-bis(3-aminophenyl)methylamine and 3-phenylpyrrolidine; and at least partially-aromatic amines which are substituted hydrocarbon amines as illustrated by p-chloroaniline, β-aminopyridine, m-methoxyaniline, p-dimethylaminoaniline, N-(3-chloropropyl)benzylamine, phenoxymethylamine, 4,4'-diamino-2,2'-dibromobiphenyl, p-trichloromethylaniline, N-methyl-p-ethoxyaniline and 2,2-bis(4-amino-3-bromophenyl)propane.

In general, hydrocarbon and halohydrocarbon amines, generically designated (halo)hydrocarbon amines, are preferred over amine reactants having atoms other than the carbon, hydrogen, halogen, and the amino nitrogen atoms of the (halo)hydrocarbon amine reactants, and monoamines are preferred over analogous polyamino compounds. Particularly preferred are primary and secondary hydrocarbon monoamines wherein the hydrocarbon moiety is hydrocarbon of up to 12 carbon atoms and is free from non-aromatic unsaturation. The class of amines comprising aniline and N-lower alkyl derivatives thereof, i.e., N-(non- to mono-alkyl)aniline wherein any alkyl moiety is alkyl of up to 4 carbon atoms, provides particularly desirable results.

The optimum ratio of amine reactant to conjugated diene will depend in part upon the functionality of the amine reactant, that is, the number of non-tertiary amino groups present in the amine reactant molecule, and the extent of conversion that is employed. Ratios of moles of conjugated diene reactant to moles of non-tertiary amino group as low as about 1:10 are suitable if only a low conversion of the amine is employed. However, to obtain higher conversions, a more substantial proportion of diene is preferred and molar ratios of conjugated diene to non-tertiary amino group from about 1:4 to about 10:1 are more satisfactory. Best results are obtained when the molar ratio of diene to non-tertiary amino group is from about 1:1 to about 6:1. It should be understood that it is within the contemplated scope of the invention to react, on occasion, only a portion of the non-tertiary amino groups present in the amine reactant molecule. For example, in the case of a diamine, reaction takes place at both amine sites, or alternatively it is contemplated to effect reaction at only one amine group. The restrictive amine formation of the latter illustration is favored by molar reactant ratios comparatively high in the amine reactant.

The catalyst employed in the process of the invention is a metal compound wherein the metal is selected from palladium, platinum and ruthenium. Particularly preferred as catalyst is a compound of a VIII C metal having an atomic number from 46 to 78 inclusive, i.e., palladium and platinum. Most preferred as catalyst is a compound of palladium. Without wishing to be bound by any particular theory, it appears that the chemical transformations during the course of the reaction which involve the metal compound are quite complex, probably involving the formation and destruction of complexes between the metal moiety and the diene reactant and/or the presumed diene dimer intermediate. Metal compounds that are soluble in the reaction medium as well as compounds that are superficially insoluble in the reaction system are operable, apparently in the latter case through dissolved metal compound moieties, the formation of which is probably influenced by interaction with the diene reactant and/or the amine reactant and the solubilization resulting therefrom. To obtain optimum reaction rates, the metallic compound is preferably soluble in the reaction mixtures or serves as precursor of a soluble metal compound. It is apparent, however, that the metal-containing catalyst may be employed in any form which serves to introduce the metal compound into the reaction system.

In one modification of the invention, the metal-containing catalyst is introduced as a salt, and palladium, platinum or ruthenium salts of organic or inorganic acids which are strong or weak acids are suitable. When the metal-containing catalyst is provided as a salt, best results are obtained through utilization of a metal halide, e.g., platinum chloride, platinum bromide, palladium chloride, palladium iodide, ruthenium chloride, ruthenium bromide and the like, an particularly suitable results are obtained when metal chlorides are employed. Also suitable are salts wherein the metal is present in the anion, as for example in the case of palladium, the use of chloropallaidate salt is satisfactory, particularly an alkali metal pallidate, e.g., sodium chloropallidate.

In an alternate modification of the process, the catalyst is provided in the form of a metal complex. Employing palladium for purposes of illustration, one type of suitable complex is a complex of a palladium salt and organic ligand, such as is represented by the formula $$L_2PdX_2$$

wherein X is halogen, preferably chlorine, and L is a tertiary nitrogen containing ligand complexed with the palladium through the nitrogen moiety thereof. Illustrative of such L groups are nitriles, both aromatic and aliphatic, such as benzonitrile, propionitrile, acetonitrile, toluonitrile and the like; heterocyclic tertiary nitrogen compounds such as pyridine, quinoline, isoquinoline, picoline and lutidine; and tertiary aliphatic amines such as triethylamine, tributylamine, and dimethylhexylamine.

An equally suitable type of palladium complex is a π-allyl complex of palladium. The simplest member of this class is a π-allyl palladium salt which, when the anion is chlorine, is represented by the following formula.

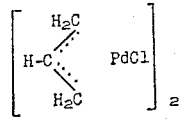

The preparation of this complex and related complexes is described by Huttel et al., Angew, Chemie, 71, 456(1959). Other illustrative π-allyl complexes are represented by the formula.

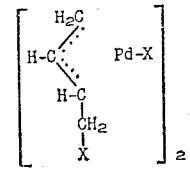

wherein X is halogen, which complexes are conveniently prepared by reaction of a conjugated diene, e.g., butadiene or isoprepene, with palladium halide in hydrocarbon media in the presence of other ligands, e.g., benzonitrile. Although alternate methods are available for calculating the oxidation state of the palladium present in such π-allyl complexes, it is herein considered that the palladium is palladium (II). It should be understood that analogous complexes of platinum and ruthenium are also suitable as catalyst in the process of the invention, although as previously stated, palladium-containing catalysts are generally to be preferred.

In an additional modification of the process of the invention, the metal-containing catalyst is provided in the form of a commercial supported elemental metal catalyst. Although the apparent oxidation state of the metal in such supported catalysts is zero, which elemental metal is not soluble in the reaction mixture and therefore does not act directly as a catalyst, sufficient metallic species of ionic character are present as impurities in commercial "metal (O)" catalyst so as to enable such a catalyst to be employed as a source of metal compound.

It is considered that in each above case the palladium or platinum is added as a palladium (II) or platinum (II) compound and the ruthenium is added as a ruthenium (III) compound, which compounds serve as catalyst or catalyst precursor in the process of the invention. Largely for reasons of convenience and economy, the preferred metal-containing catalyst is palladium chloride.

The process of the invention is characterized by the requirement for only catalytic quantities of platinum, palladium or ruthenium compound. Although utilization of larger amounts of metal-containing catalyst is not detrimental to the process of the invention, amounts larger than about 1% mole based on total reactants are not generally required. Amounts of metal compound less than about 0.001% mole on the same basis are generally unsuitable because of the inevitable physical losses of catalyst during reaction and processing. In most instances, amounts of catalyst from about 0.01% mole to about 0.5% mole based on total reactants are satisfactory and are preferred.

Although in certain applications the metal compound alone serves as an effective catalyst, the activity of the metal compound is greatly enhanced by the presence within the reaction mixture of a phenoxide anion catalyst promoter. By the term "phenoxide anion" as employed herein is meant the anion resulting, in effect, from removal of the hydrogen moiety of at least one phenolic hydroxyl group of a phenol, i.e., a compound having at least one hydroxyl group bonded to a carbon atom which is a member of an aromatic ring. The structure of the phenoxide anion is not critical and anions derived from phenols of up to 20 carbon atoms which are mononuclear or polynuclear and are phenols of from 1 to 4 phenolic hydroxyl groups are suitably employed. The phenoxide anion is monovalent, that is, a monoanion corresponding to the moiety obtained by removal of the hydrogen of one phenolic hydroxyl group, or is multivalent, i.e., a di-, tri- or quadraanion illustratively obtained by removal of the hydrogen of more than one phenolic hydroxyl group of a phenol having a plurality of phenolic hydroxyl groups. Although phenoxide anions of relatively complex structure are suitably employed as catalyst promoter in the process of the invention, largely for reasons of convenience and economy it is preferable to employ a phenoxide anion of comparatively simple structure, for example, an anion of a mononuclear monohydric phenol which is a hydrocarbon phenol of from 6 to 10 carbon atoms containing only atoms of carbon and hydrogen besides the oxygen of the phenolic hydroxyl group, or is a halohydrocarbon phenol additionally having one or more, preferably from 1 to 2, atoms of halogen, particularly chlorine, within the molecule. These phenols are generically designated monohydric (halo)hydrocarbon phenols and the anion thereof as a (halo)hydrocarbon phenoxide monoanion, and are illustrated, in the case of the phenols, by phenol, the cresols, p-chlorophenol, p-tert-butylphenol, the xylenols, 2,4-dichlorophenol, 3,5-diethylphenol and the like. Particularly preferred as the catalyst promoter in the process of the invention is the phenate anion, that is, the anion illustratively produced by removal of the acidic hydrogen of phenol.

The presence of phenoxide anion in the reaction system may be brought about by any convenient method. In one modification of the process of the invention, the phenoxide anion is prepared in situ by addition of a suitable phenol to the reaction mixture. Reaction of the phenol with a minor proportion of the amine reactant present results in formation of the phenoxide anion. Alternatively, other bases are added to react preferentially with the phenol because of the more basic character thereof, e.g., tertiary amines such as triethylamine, trimethylamine, pyridine and quinoline. In the preferred modification of the process of the invention, the phenoxide anion is added as a preformed material, e.g., as a soluble metal salt of a phenol. Suitable metal salts include alkali metal phenoxides, particularly sodium phenoxides, which are conveniently prepared by neutralization of a suitable phenol with alkali metal base, for example, an alkali metal hydroxide such as sodium hydroxide, or by direct reaction of the phenol with alkali metal.

The role of the phenoxide anion in the process of the invention is not completely understood. Without wishing to be bound by any particular theory, it appears probable that the phenoxide anion serves as a metal-bound ligand in metal-diene complexes which are possible intermediate species in the formation of the N-alkadienylamines of the invention. The phenoxide anion is desirably present in molar amounts that are equal to or greater than the molar amount of metal-containing catalyst compound. Molar ratios of phenoxide anion to metal compound from about 1:1 to about 8:1 are satisfactory, although molar ratios from about 1:1 to about 4:1 are preferred.

The process of the invention is typically conducted by charging the reactants, catalyst and catalyst promoter to an autoclave or similar reactor and maintaining the reaction mixture at reaction temperature until reaction is complete. The method of mixing is not critical although it is generally preferred to mix the reactants and add the catalyst and catalyst promoter thereto. The reaction is suitably conducted throughout a wide range of reaction temperatures and pressures, so long as the reactants are maintained substantially in the liquid phase. Reaction temperatures from about −20° C. to about 150° C. are satisfactory, although temperatures from about 0° C. to about 130° C. are preferred and best results are obtained when a temperature from about 80° C. to about 125° C. is employed. Typical reaction pressures vary from about 1 atmosphere to about 80 atmospheres. Frequently, good results are obtained when the reaction pressure is autogenous, that is, the pressure generated when the reactants are maintained at reaction temperature in a sealed reaction vessel. Such pressures are from about 1 atmosphere to about 20 atmospheres.

The process of the invention is conducted in the presence or in the absence of a solvent. In the modification wherein solvent is employed, solvents that are suitable are those capable of dissolving the reactants, catalyst and catalyst promoter, and are inert to the reactants and the products prepared therefrom. Exemplary solvents are ethers, including dialkyl ethers such as diethyl ether, dibutyl ether and methyl hexyl ether; alkyl aryl ethers such as anisole and phenyl butyl ether; cyclic ethers such as tetrahydrofuran, dioxane and dioxolane; and lower alkyl ethers (full) of polyhydric alcohols or polyoxyalkylene glycols such as ethylene glycol dimethyl ether, diethylene glycol dimethyl ether, tetraethylene glycol dimethyl ether and glycerol triethyl ether; aromatic hydrocarbons such as benzene, toluene and xylene; N,N-dialkyl alkanoic acid amides, e.g., dimethylformamide and N,N-diethylacetamide; halogenated hydrocarbons such as chloroform, carbon tetrachloride, tetrachloroethylene, methylene chloride and bromoform; sulfoxides such as dimethylsulfoxide; and nitriles such as acetonitrile and benzonitrile. The solvent, if any, is employed in molar excess over the amount of total reactants, and in general, moles of solvent up to about 150 moles per mole of total reactants are satisfactory. For convenience, it is generally preferred to conduct the reaction in the absence of added solvent whenever the physical characteristics of the reaction mixture, particularly the melting point, will allow.

Subsequent to reaction, the reaction mixture is separated and the desired product recovered by conventional means such as selective extraction, fractional distillation and chromatographic techniques.

The products of the invention are N-(alkadienyl) amines illustratively produced by dimerization of the diene reactant and reaction of the diene dimer with the amine reactant to effect the N-alkadienylation, that is, to effect the introduction of the alkadienyl moiety as a nitrogen-substituent, of at least one of the non-tertiary amino nitrogen moieties. In terms of the organic amine reactants as previously defined, the products of the invention are N-(alkadienyl)amines wherein the alkadienyl moiety is 2,7-octadienyl or methyl-substituted 2,7-octadienyl, depending upon the particular diene employed, and the amine moiety is that moiety illustratively obtained by removal of at least one N-hydrogen substituent of an organic amine of up to 20 carbon atoms and of from 1 to 4 amino-nitrogen atoms, at least one of which is a non-tertiary amino moiety, that is, possesses at least one hydrogen substituent. The octadienyl moiety will have from 0 to 4 methyl substituents, depending upon the degree of methyl substitution on the diene reactant. When butadiene is employed as the diene reactant, the alkadienyl moiety will be 2,7-octadienyl. Alternatively, when the diene reactants is isoprene, the alkadienyl moiety is principally 3,7-dimethyl-2,7-octadienyl and/or 3,6-dimethyl-2,7-octadienyl and when 2,3-dimethylbutadiene is the diene reactant, the alkadienyl moiety is 2,3,6,7-tetramethyl-2,7-octadienyl. Generically these alkadienyl moieties are represented by the formula

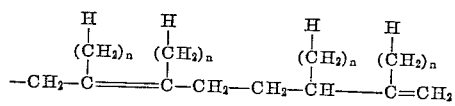

wherein $n$ independently is a whole number from 0 to 1 inclusive. Although it is within the contemplated scope of the present invention to effect reaction at each non-tertiary amino moiety, it is also within the contemplated scope to N-alkadienylate only a portion of the non-tertiary amino groups present, for example, to effect reaction at only one reactive site of an organic diamine. The process, in practice, is applied particularly to the formation of mono-2,7-alkadienyl derivatives of any particular amino nitrogen atom, even though the nitrogen atom, subsequent to initial reaction, may yet be non-tertiary. For example, a primary amine such as aniline readily forms a N-(2,7-alkadienyl) derivative, but little or no N,N-bis(2,7-alkadienyl) derivative is observed. The preferred product type comprises mono- or poly-amines wherein each non-tertiary amino group has undergone reaction to form the corresponding N-alkadienyl derivative.

It will be apparent that a wide variety of N-alkadienyl amines can be prepared by the process of the invention by varying the organic amine and the diene reactants. Illustrative of these products are N-(2,7-octadienyl)-aniline prepared from aniline and butadiene, N-(3,6-dimethyl-2,7-octadienyl)-N-methylaniline and N-(3,7-dimethyl-2,7-octadienyl)-N-methylaniline prepared from N-methylaniline and isoprene and N-(2,3,6,7-tetramethyl-2,7-octadienyl)-diethylamine prepared from diethylamine and 2,3-dimethylbutadiene, as well as other illustrative products such as N-(2,7-octadienyl)methylamine, N,N'-bis(2,7-octadienyl)trimethylenediamine, N-(3,6-dimethyl-2,7-octadienyl)-p-methoxyaniline, N-(2,3,6,7-tetramethyl-2,7-octadienyl)piperidine, N,N'-bis-(2,7-octadienyl)benzidine, N-(3,7-dimethyl-2,7-octadienyl)butylamine, N-(2,7-octadienyl)-α-naphthylamine, N-(2,7-octadienyl)-m-dimethylaminoaniline, N-(2,7-octadienyl)-3-chloroethylamine, N-(3,6-dimethyl-2,7-octadienyl)-4-aminohexylamine, 4,4'-bis(2,7-octadienylamino)biphenyl, N-(2,7-octadienyl)-4-acetoxybutylamine, N-(3,6-dimethyl-2,7-octadienyl)-2-dodecylamine, N-(2,7-octadienyl)-2,4-dichloroaniline and N-(2,7-octadienyl)cyclohexylamine.

The products of the invention are useful in a variety of applications. The remaining unsaturated linkages can be hydrated or hydroxylated to form useful alcohol derivatives from which esters or ethers are prepared. The amino moieties are oxidized to form useful amine-N-oxides or reacted with mineral acids to form quaternary ammonium salts. The ethylenic linkage serves as a dienophile in Diels-Alder condensations or as a reactive site in polymerization or co-polymerization processes, and can be epoxidized to form epoxy derivatives which react with a variety of curing agents to form epoxy resins.

To further illustrate the process of the invention and the novel products obtained thereby, the following examples are provided. It should be understood that the details thereof are not to be regarded as limitations as they may be varied as will be understood by one skilled in this art.

*Example I*

To a glass ampoule was charged 0.33 mole of aniline, 1.0 mole of butadiene, 1 g. of palladium chloride and 2 g. of sodium phenate. The ampoule was sealed and maintained at 100° C. for approximately 22 hours. The ampoule was then cooled and opened and the product mixture was removed, filtered and analyzed by gas-liquid chromatography. The conversion of aniline was found to be 50% and the yield of N-(2,7-octadienyl)aniline, B.P. 120° C. at 2 mm., was 50% based upon the aniline converted. A sample of the N-(2,7-octadienyl)-aniline was isolated by means of preparative gas-liquid chromatographic techniques and the structure of the product confirmed by means of analysis, molecular weight and the consistency of the nuclear magnetic resonance spectrum with the above structure. The analysis of the product was as follows:

*Analysis.*—Calc.: C, 83.5% wt.; H, 9.5% wt.; N, 6.9% wt.; molec. wt. 201. Found C, 82.8% wt.; H, 9.4% wt.; N, 6.8% wt.; molec. wt., 203±6.

A good yield of N-(2,7-octadienyl)aniline is also obtained when platinum chloride is employed as catalyst in place of the palladium chloride of the above example.

*Example II*

To a glass ampoule was charged 0.33 mole of N-methylaniline, 1.0 mole of butadiene, 1 g. of palladium chloride and 2 g. of sodium phenate. The ampoule was sealed and maintained at 100° C. for approximately 22 hours. Subsequent to cooling and opening the ampoule, the product mixture was filtered and worked up according to the procedure of Example I. The product, N-(2,7-octadienyl)-N-methylaniline, B.P. 115° C. at 2 mm., was obtained in 65% yield based upon a 34% conversion of N-methylaniline, and the product structure was confirmed on the basis of analysis, molecular weight, and the consistency of the nuclear magnetic resonance spectrum with the above structure. The analysis was as follows:

*Analysis.*—Calc.: C, 83.6% wt.; H, 9.8% wt.; N, 6.5% wt.; molec. wt. 215% wt. Found: C, 83.8% wt.; H, 9.8% wt.; N, 6.2% wt.; molec. wt., 217±7.

When isoprene is employed as the diene reactant in place of the butadiene of the above experiment, a good yield of a mixture of N-(dimethyl-2,7-octadienyl)-N-methylanilines is obtained, which mixture principally comprises N-(3,6-dimethyl-2,7-octadienyl)-N-methylaniline and N-(3,7-dimethyl-2,7-octadienyl)-N-methylaniline.

Similar results are obtained when ruthenium chloride is employed in place of the palladium chloride of the above example.

*Example III*

Employing the procedure of Example I, tetramethylenediamine is reacted with butadiene in the presence of π-allyl palladium chloride as catalyst and sodium p-chlorophenoxide as catalyst promoter. Upon work-up of the product mixture, good yields of N-(2,7-octadienyl)-4-aminobutylamine and N,N'-bis(2,7-octadienyl)tetramethylenediamine are obtained.

*Example IV*

The procedure of Example I was followed to react 2-hexylamine with butadiene in the presence of platinum bromide as catalyst and sodium phenate as catalyst promoter. A good yield of N-(2,7-octadienyl)-2-hexylamine is obtained.

*Example V*

When the procedure of Exmple I is repeated to effect reaction between α-naphthylamine and 2,3-dimethylbutadiene in the presence of palladium chloride and sodium phenate in acetonitrile solution, a good yield of N-(2,3,6,7-tetramethyl-2,7-octadienyl)-α-naphthylamine is obtained.

I claim as my invention:

1. The N-(alkadienyl)amine wherein the amine moiety is that of an organic amine of up to 20 carbon atoms and from 1 to 4 amino moieties, at least one of which amino moieties of said organic amine being amino of from 1 to 2 hydrogen substituents, and at least one of the amino moieties of said N-(alkadienyl)amine is substituted with the moiety represented by the formula

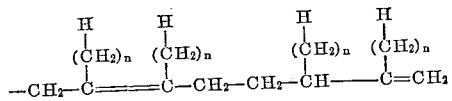

wherein $n$ independently is a whole number from 0 to 1 inclusive.

2. The N-(alkadienyl)amine wherein the amine moiety is that of a (halo)hydrocarbon amine of up to 20 carbon atoms and from 1 to 4 amino moieties, at least one of which amino moieties of said (halo)hydrocarbon amine being amino of from 1 to 2 hydrogen substituents, and at least one of the amino moieties of said N-(alkadienyl)

amine is substituted with the moiety represented by the formula

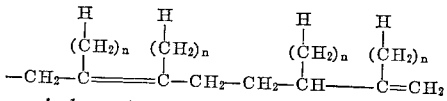

wherein $n$ independently is a whole number from 0 to 1 inclusive.

3. The N-(alkadienyl)amine wherein the amine moiety is that of a (halo)hydrocarbon amine of up to 20 carbon atoms and from 1 to 2 amino moieties, at least one of which amino moieties of said (halo)hydrocarbon amine being amino of from 1 to 2 hydrogen substituents, and at least one of the amino moieties of said N-(alkadienyl)amine is substituted with the moiety represented by the formula

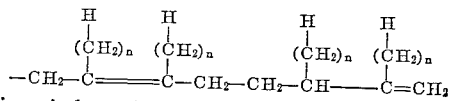

wherein $n$ independently is a whole number from 0 to 1 inclusive.

4. The N-(alkadienyl)amine wherein the amine moiety is that of a (halo)hydrocarbon amine of up to 20 carbon atoms and from 1 to 2 amino moieties, at least one of which amino moieties of said (halo)hydrocarbon amine being amino of from 1 to 2 hydrogen substituents, and each of the amino moieties of said N-(alkadienyl)amine is substituted with the moiety represented by the formula

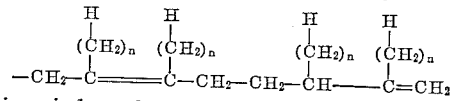

wherein $n$ independently is a whole number from 0 to 1 inclusive.

5. The N-(alkadienyl)-N-(non- to mono-alkyl)aniline wherein any alkyl moiety is alkyl of up to 4 carbon atoms and the alkadienyl moiety is represented by the formula

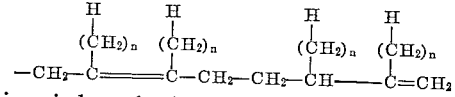

wherein $n$ independently is a whole number from 0 to 1 inclusive.

6. The amine of claim 5 wherein the alkadienyl moiety is 2,7-octadienyl.

7. The compound N-(2,7-octadienyl)aniline.

8. The compound N-(2,7-octadienyl)-N-methylaniline.

9. The compound N,N'-bis(2,7-octadienyl)tetramethylenediamine.

10. The process of producing N-(alkadienyl)amine by contacting an organic amine having at least one N-hydrogen substituent with a conjugated diene comprising butadiene with from 0 to 2 internal-carbon methyl substituents, in the presence of metal compound catalyst, said metal being selected from the group consisting of palladium, platinum and ruthenium, and a phenoxide anion catalyst promoter.

11. The process of producing N-(alkadienyl)amine by contacting an organic amine of up to 20 carbon atoms and from 1 to 4 amino moieties, at least one of which amino moieties has from 1 to 2 hydrogen substituents, with from about 0.1 mole to about 10 moles per mole of non-tertiary amino moiety of said organic amine of a conjugated diene comprising butadiene with from 0 to 2 internal-carbon methyl substituents, in the present of metal compound catalyst, said metal being selected from the group consisting of palladium, platinum and ruthenium, and phenoxide anion catalyst promoter, said phenoxide anion corresponding to that moiety produced by removal of at least one phenolic hydroxylic hydrogen from a phenol of up to 20 carbon atoms and from 1 to 4 phenolic hydroxyl groups.

12. The process of producing N-(alkadienyl)amine by contacting (halo)hydrocarbon amine of up to 20 carbon atoms and from 1 to 4 amino moieties, at least one of which amino moieties has from 1 to 2 hydrogen substituents, with from about 0.1 mole to about 10 moles per mole of non-tertiary amino moiety of said (halo)hydrocarbon amine of a conjugated diene comprising butadiene with from 0 to 2 internal-carbon methyl substituents, in the presence of metal compound catalyst, said metal being Group VIII C metal of an atomic number from 46 to 78 inclusive, and phenoxide anion catalyst promoter, said anion being monovalent mononuclear phenoxide anion of from 6 to 10 carbon atoms.

13. The process of producing N-(alkadienyl)amines by contacting (halo)hydrocarbon amine of up to 20 carbon atoms and from 1 to 2 amino moieties, at least one of which amino moieties has from 1 to 2 hydrogen substituents, said amine being free from non-aromatic unsaturation, with from about 0.25 mole to about 10 moles per mole of non-tertiary amino moiety of said (halo)hydrocarbon amine of a conjugated diene comprising butadiene with from 0 to 2 internal methyl substituents, in the presence of palladium compound catalyst and phenoxide anion catalyst promoter, said phenoxide anion being monovalent, mononuclear, (halo)hydrocarbon phenoxide anion of from 6 to 10 carbon atoms and 1 to 2 halogen atoms, at a temperature of from about −20° C. to about 150° C.

14. The process of claim 4 wherein the catalyst promoter is provided as alkali metal phenolate.

15. The process of claim 4 wherein the (halo)hydrocarbon amine is N-(non- to mono-alkyl)aniline wherein any akyl moiety is alkyl of up to 4 carbon atoms.

16. The process of claim 6 wherein the N-(non- to mono-alkyl)-aniline is aniline.

17. The process of claim 4 wherein the (halo)hydrocarbon amine is tetramethylenediamine.

18. The process of producing N - (2,7 - octadienyl) amines by contacting hydrocarbon monoamine of up to 12 carbon atoms wherein the amino moiety has from 1 to 2 hydrogen substituents, with from about 1 mole to about 6 moles per mole of said hydrocarbon monoamine of butadiene, in the presence of from about 0.001% mole to about 1% mole based on total reactants of Group VIII–C metal halide wherein the metal is Group VIII–C metal of atomic number from 46 to 78 inclusive, and from about 1 to about 8 moles of alkali metal phenate per mole of said metal halide, at a temperature from about −20° C. to about 150° C.

19. The process of producing N-(2,7-octadienyl)aniline by contacting aniline with from about 1 mole to about 6 moles per mole of aniline of butadiene, in the presence of from about 0.001% mole to about 1% mole based on total reactants of palladium chloride and from about 1 mole to about 8 moles of sodium phenate per mole of palladium chloride, at a temperature from about 0° C. to about 130° C.

No references cited.

CHARLES B. PARKER, *Primary Examiner.*

P. C. IVES, *Assistant Examiner.*